United States Patent [19]

Mohiuddin

[11] 4,194,196
[45] Mar. 18, 1980

[54] ILLUMINATED MASTER CALENDAR AND MESSAGE RECORDING SYSTEM

[76] Inventor: Mohammed S. Mohiuddin, 920 W. Lakeside, Apt. 1511, Chicago, Ill. 60640

[21] Appl. No.: 845,047

[22] Filed: Oct. 25, 1977

[51] Int. Cl.² .............................................. G06F 3/14
[52] U.S. Cl. ..................................... 340/711; 40/107; 340/365 C; 340/692; 368/29
[58] Field of Search ............... 58/4 A, 4 R, 4 M; 40/107; 340/711, 712, 365 C, 365 R, 286 M, 525, 692

[56] References Cited

U.S. PATENT DOCUMENTS

| | | | |
|---|---|---|---|
| 803,495 | 10/1905 | Wilson . | |
| 3,276,198 | 10/1966 | Barbera . | |
| 3,653,204 | 4/1972 | Miwa | 58/4 A |
| 3,751,825 | 8/1973 | Barrett | 340/286 M |
| 3,797,222 | 3/1974 | Kato | 58/4 A |
| 3,810,322 | 5/1974 | Ritchie | 40/107 |
| 3,940,920 | 3/1976 | Nakamura et al. | 58/4 A |
| 3,975,846 | 8/1976 | Wecker | 58/4 A |
| 4,055,749 | 10/1977 | Kraushaar | 40/107 |

FOREIGN PATENT DOCUMENTS 803785 10/1958 United Kingdom .

Primary Examiner—Marshall M. Curtis
Attorney, Agent, or Firm—Hill, Van Santen, Steadman, Chiara & Simpson

[57] ABSTRACT

An illuminated master calendar is disclosed having a short depth profile and suitable for mounting on a wall. A front panel of the housing has a first group of momentary contact touch sensitive switches mounted thereon with each switch having a transparent pushbutton face through which illuminated indicia are visible when the switch is depressed. The first group of switches is representative of each of the days of the month, a similar second group of switches is provided for each of the months of the year, and a third group for each of the days of the week. A circuit is provided for illuminating a light source behind each of the indicia when the corresponding switch is touched. The circuit also maintains illumination of the indicia after the switch is released. A reset switch and associated reset circuit are connected for extinguishing all illuminated indicia and preparing each of the switches with associated indicia for reactivation. A tape recorder memory system may also be associated with the calender such that predetermined segments of a tape corresponding to each of the days of the month are provided for recording of messages corresponding to each of such days.

9 Claims, 6 Drawing Figures

ILLUMINATED MASTER CALENDAR AND MESSAGE RECORDING SYSTEM

BACKGROUND OF THE INVENTION

1. Field of the Invention

This invention relates to master calendar systems.

2. Description of the Prior Art

Illuminated calendars are known in which a plurality of lamps positioned behind a calendar sheet selectively illuminate individual days of the month. Automatic control means is provided for sequentially energizing the lamps in a pattern corresponding to the calendar days. Such calendar display devices are also known in relation to universal or perpetual calendars in which such a display serves as a read-out of the desired date. However, heretofore there has not been shown a calendar system in which manually activatable touch-sensitive switches have been provided in a pattern for each of the days of the month and wherein indicia representing a particular date of the month is arranged at each switch location.

Calendars commonly hung from walls in a room are most convenient for rapid check of the current date. However, if the room is darkened or if the observer is in a hurry, it is difficult for one to immediately perceive the current date without first analyzing the overall format of the calendar in order to associate the date with the particular day of the week.

SUMMARY OF THE INVENTION

It is an object of the present invention to provide a calendar which may be rapidly read by an observer and on which the observer may conveniently program the current date with a pattern of touch sensitive buttons similar to a calendar pattern.

It is a further object of this invention to provide a calendar of the wall mounting type which provides rapid indication of the current date to an observer, particularly in darkened or low light areas.

According to the invention, an illuminated master calendar is provided with a housing and an associated front panel. A plurality of touch sensitive switches is provided in a predetermined pattern on the front panel with indicia at each switch location for indicating each of the days of a month. Indicia are also provided for indicating a month of the year. Illumination members for illuminating each of the associated indicia is provided such that the illumination members are illuminated when an associated switch is activated. Preferably the indicia are visible through a clear face of a push button touch sensitive type switch. The indicia remain illuminated after release of the touch sensitive switch and circuits are provided for resetting all previously activated illumination members in order to clear an old date and permit entry of a new date.

BRIEF DESCRIPTION OF THE DRAWINGS

FIG. 4 is a block diagram illustrating the construction of indicator means for the memory illustrated in FIG. 3; and FIG. 5 is a side view showing in detail the illuminating of indices through a push button switch face.

DESCRIPTION OF THE PREFERRED EMBODIMENTS

Figure 1:
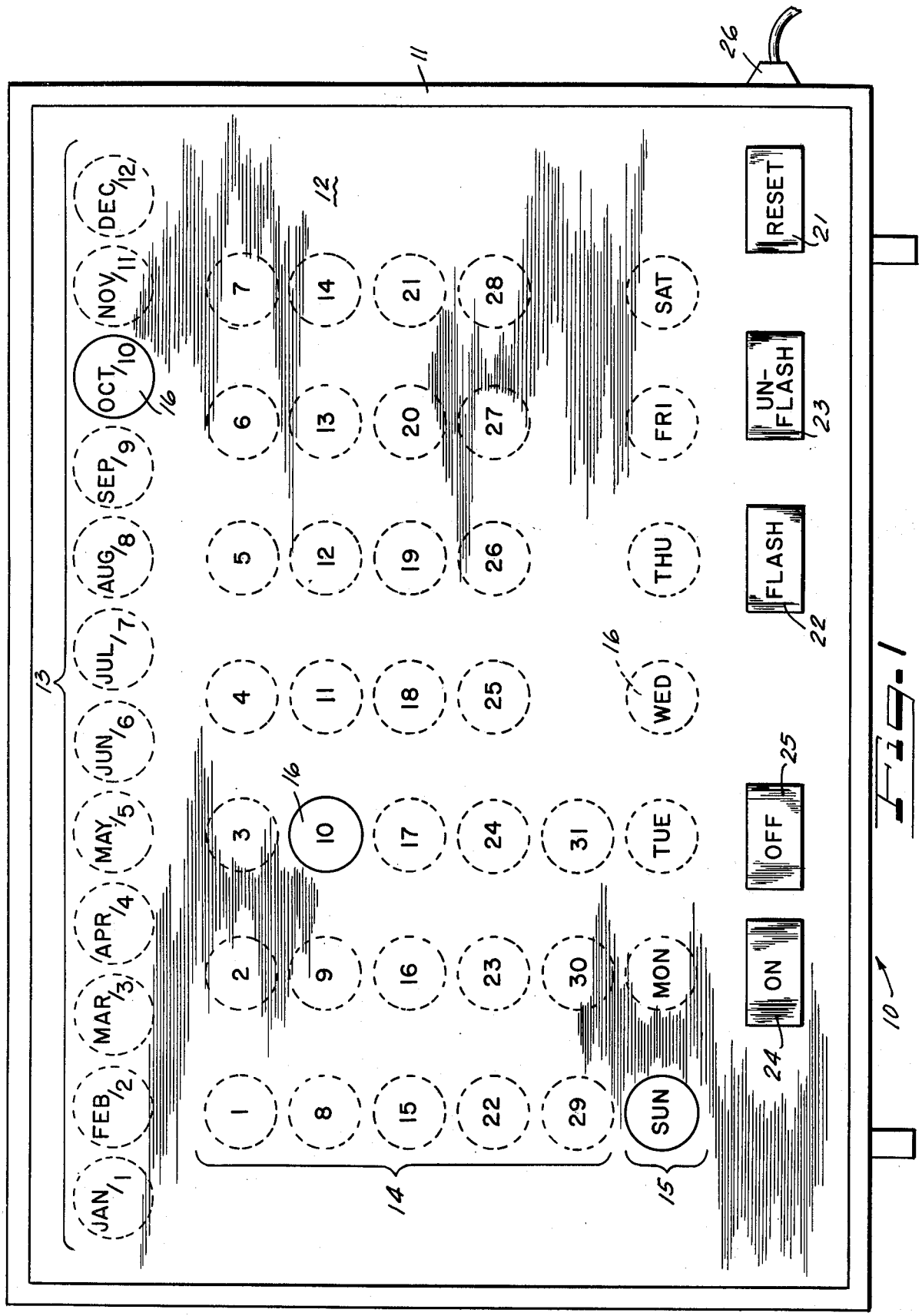
FIG. 1 is a front view of a master calendar according to the invention.

Referring to FIG. 1, an illuminated master calendar of this invention is generally shown at 10. A housing or encasement 11 is provided which is preferably suited for wall mounting. Consequently, the depth profile of the housing is preferably less than two inches. A front display panel 12 is mounted on a front of the housing 11 and contains a month display 13, a date display 14, and a days of the week display 15. The month display 13 is comprised of a roll of display switches 16 along a top portion of the panel 12. Similarly, the date display comprises a two dimensional matrix of similar display switches 16 in known calendar format. Finally, the days of the week display 15 comprises a horizontal row along a bottom of the display panel 12 and similarly comprises display switches 16.

On and off switches 24 and 25 are provided for controlling a power supply in the calendar and, if operation from the AC line is desired, a cord 26 is provided. As will be described later, a reset switch 21, a flash switch 22, and an unflash switch 23 may be provided on the front panel.

Referring now to FIG. 5, the detailed construction for each of the switches 16 is shown. A clear face translucent push button 17 preferably made of plastic is mounted in an aperture of the front panel 12. A pressure sensitive momentary contact switch 19 having switch contacts 19a and 19b is provided directly behind the push button 17. One of the switch arms such as 19a may bias the button 17 in a normally outward position. When one depresses the button in the direction 18, the switch contacts close. Circuitry is then provided such that an illumination member 20 such as a light emitting diode, an incandescent lamp, or a gas discharge lamp becomes activated. The light from the illumination member 20 shines through indicia 18 which may be mounted either in the translucent push button 17 or directly behind it at 18'.

Figure 2:
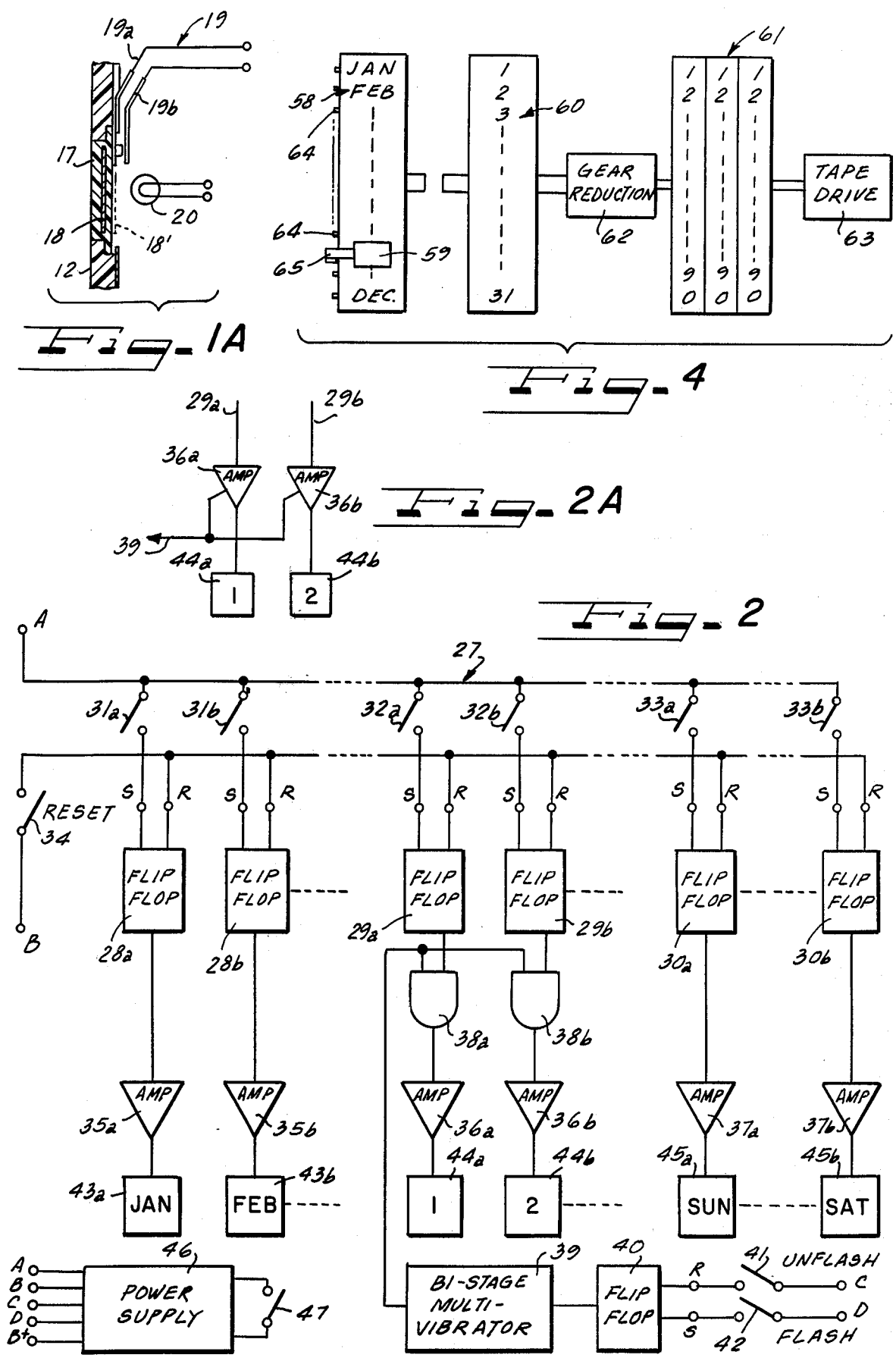
FIG. 2A is a circuit diagram illustrating the logic circuitry useful with this invention.
FIG. 2B is a circuit diagram for an alternate embodiment for a portion of the circuit shown in FIG. 2A.

Referring now to FIG. 2A, the circuitry for operation of the calendar of FIG. 1 is illustrated. For each of the months of the year, a flip-flop 28, an amplifier 35, a switch 31 and an illuminating member 43 is provided. For example, for January a switch 31a similar to the switch 16 described above, connects a potential A to a SET terminal of a flip-flop 28a. A RESET terminal of the flip-flop 28a connects via a reset switch 34 to another potential B. The output of the flip-flop 28a connects through an amplifier 35a to the illuminating member 43a for January.

For the first day of the month, for example, a switch 32a, a flip-flop 29a, an AND gate 38a, an amplifier 36a and an illuminating member 44a are provided. For example, for the first day of the month, a switch 32a connects the potential A to the SET terminal of the flip-flop. A RESET terminal of the flip-flop 29a connects via the reset switch 34 to the potential B. The output of the flip-flop 29a connects to one input terminal of an AND gate 38a. The output of the AND gate connects through an amplifier 36a to an illuminating member 44a. The other terminal of the AND gate connects to a bistable multivibrator 39. Operation of the multivibrator 39 is controlled by a flip-flop 40 which in turn is activated by a flash switch 42 and an unflash switch 41 via the SET and RESET terminals of the flip-flop 40, respectively. The unflash switch 41 connects to a voltage potential C and the flash switch 42 to a reference potential D.

The circuitry for each of the days of the week is similar to that as described for each of the months of the year with a switch 33a, a flip-flop 30a, an amplifier 37a, and an illuminating member 45a being provided for Sunday, for example.

Operation of the circuit of FIG. 2A will now be described. When one presses the push button corresponding to one of the months of the year, say for instance January, the flip-flop 28a will be set. This applies a potential through the amplifier 35a to illuminate the illuminating member 43a. After the switch 31a is released, the flip-flop remains set and the illumination of the indicia continues. If one then presses a switch 32a corresponding to the first day of the month, the flip-flop 29a will be set and apply a predetermined input to the AND gate 38a. If the bi-stable multivibrator 39 applies the same potential to the AND gate, the illuminating member 44a will be activated via the amplifier 36a. If the bi-stable multivibrator 39 periodically changes between a high and a low state, the illuminating member 44a will flash.

Alternatively, if only a dimming of the illuminating member 44a is desirable on a periodic basis, the output of the multivibrator 39 may be connected to an auxiliary input 72 of the amplifier A in order to either reduce or increase gain of the amplifier to dim or brighten the illuminating member 44a on a periodic basis.

If the flash switch 42 is activated, the flip-flop 40 will be set which activates the bi-stable multivibrator 39. If the switch 42 is released, the flip-flop 40 will remain set. On the other hand, if the unflash switch 41 is momentarily closed, the flip-flop 40 will be reset which places the multivibrator 39 in a state which produces a continuous output, thus permitting the illuminating member 44a to remain on continuously without flashing.

Finally, if one presses a button corresponding to one of the days of the week, such as Sunday, the switch 33a will close on a momentary basis, thus activating the flip-flop 30a. The illuminating member 45a is then activated via the amplifier 37a.

It will be noted that the reset switch 34 may simultaneously connect the potential B to each of the reset terminals of the flip-flops 28, 29 and 30. This permits resetting of all the flip-flops simultaneously for entry of entirely new date information.

Figure 3:
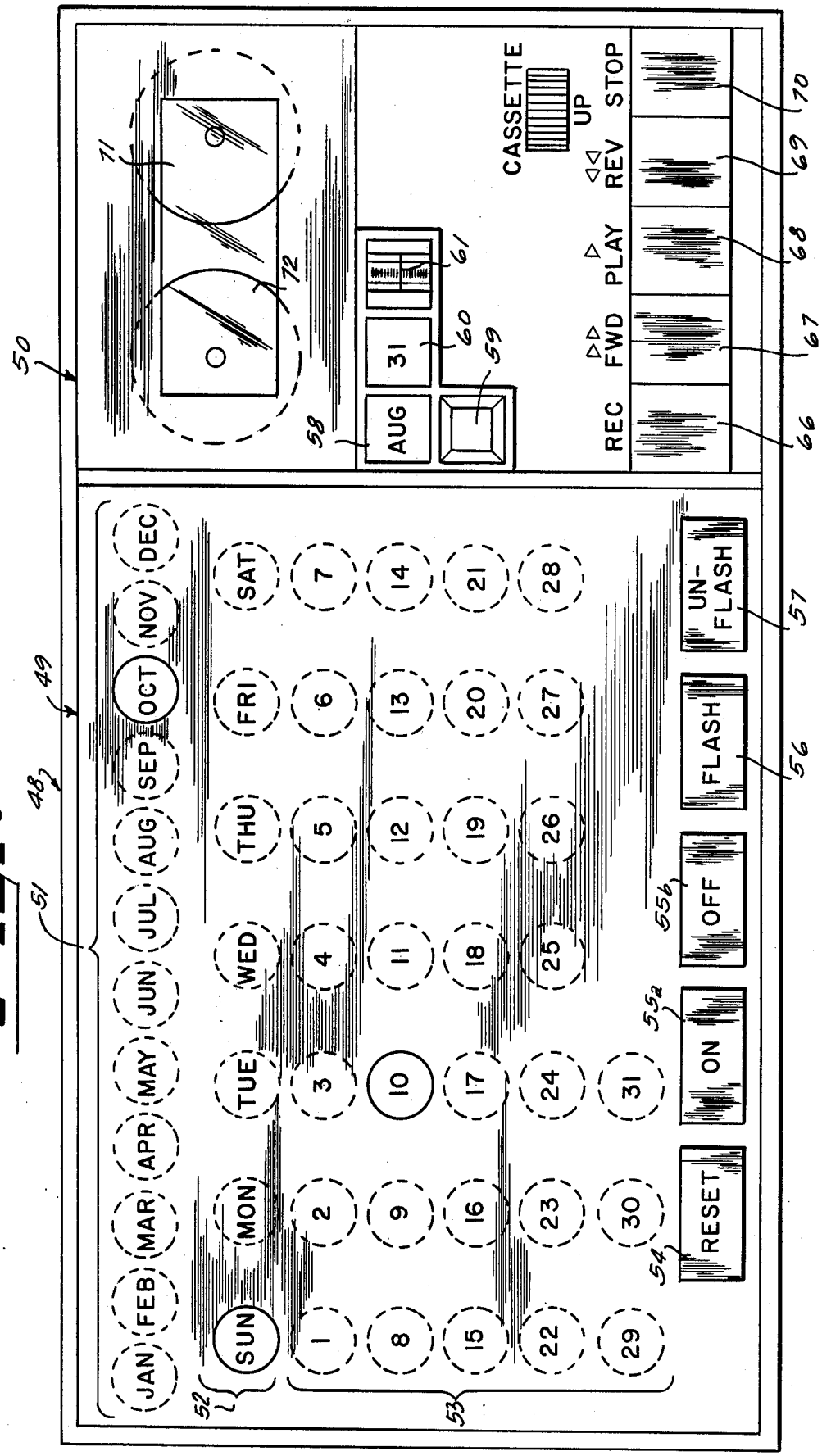
FIG. 3 is a front view of a master calendar of this invention with a memory system.

Referring now to FIG. 3, a master calendar with memory is generally shown at 48. The illuminated calendar portion 49 is similar to that of FIG. 1 and has a row of switches 51 for indicating months of the year; a row of switches 52 for indicating days of the week; and a two-dimensional matrix 53 of switches corresponding to days of the month. Similarly, a reset switch 54, on and off buttons 55a and b, and flash and unflash switches 56 and 57 are provided. Adjacent the calendar portion 49 a memory portion 50 comprising a tape recorder is provided in the same housing as with the calendar portion 49. The tape recorder has reels 71 and 72, a record switch 66, a fast/forward switch 67, a play switch 68, a fast reverse switch 69 and a stop switch 70. Below the reel 72, a month indicator 58 is provided with a push button indexing member 59. Laterally adjacent the month indicator 58 a date display 60 is provided. To the right of the date display 60 a tape position indicator 61 is shown.

Referring now to FIG. 4, the month indicator 58 is preferably a reel having each of the days of the month inscribed around a periphery thereof. The indexing switch 59 has a lever 65 for engaging with detents 64 on a side of the reel. This permits manual change of the month by the observer. The date display 60 comprises a reel with days of the month printed around the periphery thereof. This reel is driven by a gear reduction box 62 connected with a tape drive 63. The tape indicator position reels 61 similarly connect with the tape drive 63.

Preferably the tape is divided up into thirty one segments of predetermined length, such as three minutes. Each tape segment is set aside for each of the days of the month. Personal messages or reminders may be dictated onto these tape segments. When a particular date has been set on the calendar unit 49, the message corresponding to that date may be accessed by utilizing the fast forward button 67 on the tape recorder to advance to the portion of the tape of a corresponding date. This date would then be visually observed on the date display 60 at which point the tape would be stopped and the operator would then listen to the message on the corresponding segment of tape.

FIG. 2B illustrates an alternate embodiment of the invention in which the bi-stable multivibrator 39 connects directly to a gain control line of the amplifiers 36a, 36b, etc. in order to cause a dimming of the illumination members 44a, 44b on a cyclical basis rather than a complete on-off cycle as previously described.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An illuminated master calendar comprising:
   (a) a wall mounting housing having a depth of less than two inches;
   (b) a front panel for the housing;
   (c) a plurality of momentary contact touch sensitive switches arranged in a 5 row and 7 column monthly calendar format on the front panel with indicia at each switch location for indicating each of the days of a month;
   (d) a plurality of momentary contact touch sensitive switches arranged in a horizontal row on the front panel with indicia at each switch location for indicating each of the months of a year, and an additional horizontal row of touch sensitive switches with indicia at each switch location for indicating days of the week in alignment with the 7 columns of the calendar format;
   (e) a reset switch on the front panel;
   (f) illuminator means directly at each switch for illuminating only the associated indicia directly at the switch;
   (g) circuit means for illuminating the illumination means when the corresponding switch is touched and maintaining the illumination after the switch is released; and
   (h) reset circuit means connected to said reset switch for controlling said circuit means so as to extinguish all illuminated illumination means and prepare each of said illumination means for reactivation by corresponding touch sensitive switches.

2. The calendar of claim 1 in which a switch button member having a transparent face activates each of said touch sensitive switches, said associated indicia is visible through the transparent face, and indicia is positioned between the transparent face and the illumination means.

3. The calendar of claim 1 in which a switch for periodic flashing is mounted on the front panel and connects with oscillating circuit means for causing illumination means which have been activated to periodically flash.

4. The calendar of claim 3 in which said switch for periodic flashing is a touch sensitive momentary contact switch and circuit means are provided for activating the oscillating circuit means when said switch for periodic flashing is released.

5. The calendar of claim 1 in which a plurality of momentary contact touch sensitive switches are provided on the front panel with indicia associated therewith for indicating days of the week.

6. The calendar of claim 1 in which a memory means is provided in the housing for recording messages on corresponding portions of a recording medium corresponding to each of the days of the month, and indicator means connected to the memory means for permitting access to the portion of the recording medium corresponding to a day of the month illuminated on the front panel.

7. The calendar of claim 6 in which the recording medium comprises a tape with equal time interval portions set aside for each of the days of the month and said indicating means comprises a wheel with each of the days of the month printed thereon, said wheel being connected by gear means to a portion of a tape drive for the tape.

8. A system for recording and playing back messages corresponding to dates of a calendar month, comprising:
a tape recorder having means for recording and playback of message intervals on recording tape driven by a tape drive;
each message interval corresponding to a single day of a month;
said tape recorder having a counter means coupled to the tape drive, said counter means having the numerals 1 through 31 as a display indicia representing days of the month and for counting said message intervals during winding of the tape by days of the month to permit an operator to position the recording tape at a message interval corresponding to a day of the month for which the message interval is to be recorded on or played back; and
a manually settable display means for indicating one of the twelve months of the year.

9. A system for recording and playing back messages corresponding to dates of a calendar month, comprising:
a tape recorder having means for recording and playback of message intervals on recording tape driven by a tape drive;
each message interval corresponding to a single day of a month;
said tape recorder having a counter means coupled to the tape drive, said counter means having the numerals 1 through 31 as a display indicia representing days of the month and for counting said message intervals during winding of the tape by days of the month to permit an operator to position the recording tape at a message interval corresponding to a day of the month for which the message interval is to be recorded on or played back;
a manually settable display means for indicating one of the twelve months of the year; and
an illuminated master calendar in a housing which commonly contains said tape recorder adjacent the master calendar, said master calendar having a plurality of momentary contact touch sensitive switches, and illumination means at each switch location for illuminating an indicia representing one of the days of the month corresponding to the switch touched, the illumination means serving as a visual guide for an operator when referencing one of said message intervals.

* * * * *